TRANSISTOR HYBRID CIRCUIT

Filed Dec. 23, 1966

INVENTOR
W. B. GAUNT, JR.
BY
R. C. Winter
ATTORNEY

United States Patent Office 3,530,260
Patented Sept. 22, 1970

3,530,260
TRANSISTOR HYBRID CIRCUIT
Wilmer B. Gaunt, Jr., Boxford, Mass., assignor to Bell Telephone Laboratories, Incorporated, Murray Hill and Berkeley Heights, N.J., a corporation of New York
Filed Dec. 23, 1966, Ser. No. 604,267
Int. Cl. H04m *1/58*
U.S. Cl. 179—170 7 Claims

ABSTRACT OF THE DISCLOSURE

A transistor hybrid circuit is described which couples the incoming and outgoing paths of a four-wire communications line to a bidirectional two-wire communications line. A first differential amplifier applies a balanced incoming path signal to the two-wire line in response to an unbalanced incoming path signal. The balanced incoming path signal and an outgoing signal from the two-wire line are applied to a second differential amplifier, the output of which is connected to the outgoing path. The unbalanced incoming path signal is also applied to the second amplifier to cancel the incoming path signal from the two-wire line thereby preventing coupling of signals from the incoming path to the outgoing path of the four-wire line.

Figure 1:
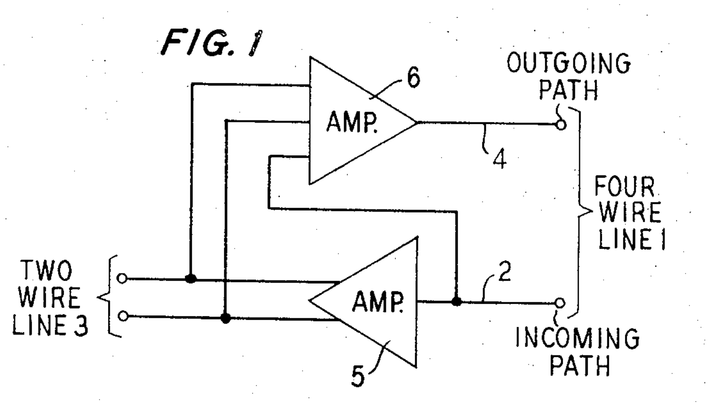

This invention relates to a signal transmission circuits and more particularly to electronic hybrid circuits for coupling signals between two-wire lines and four-wire lines such as are used in telephone and other communications systems.

In communications systems it is often preferred to transmit signals between two points over one bidirectional or two-way transmission path. A single path, such as a pair of wires, can then provide two-way communications in an economical manner. It is, however, sometimes necessary to use a pair of one-way transmission paths between two points. Signals are sent only in one direction over one path and only in the opposite direction over the second path. This is the situation in long distance communications where several conventional one-way amplifiers are required in each transmission path to overcome signal losses suffered in passage through the transmission system. The coupling of signals between a pair of one-way transmission paths and a two-way transmission path requires a hybrid circuit to properly direct the signal transmission between the bidirectional path and the pair of one-way paths. In a telephone system, for example, a four-wire line which may provide a long distance voice communication link consists of an incoming one-way transmission path and an electrically separated outgoing one-way transmission path. A two-wire line which may connect a telephone station to this communications link is a single bidirectional transmission line.

It is the purpose of a hybrid circuit to transmit a signal from the incoming path of such a four-wire line to the bidirectional two-wire line and a signal from the two-wire line to the outgoing path of the four-wire line without allowing any portion of the incoming path signal to be coupled to the outgoing path of the four-wire line. It may also be the purpose of the hybrid circut to prevent any portion of the two-wire line signal from appearing on the incoming path. Undesired effects may result from either of these conditions, the former being particularly troublesome. Oscillatory regeneration and interference can result which can substantially degrade the quality of signal transmission.

While special transformers and balancing circuits customarily have been used in hybrid applications, several electronic hybrid circuits have been proposed to assure proper coupling of signals between two-wire and four-wire lines. In one type of electronic hybrid known in the art, and disclosed for example in Wang 2,511,948, a signal from the incoming path of a four-wire line is coupled to a two-wire line through a first amplifier and is further coupled, along with signals appearing on the two-wire line, through a second amplifier to the outgoing path of the four-wire line. In order to prevent any portion of the incoming path signal from appearing on the outgoing path of the four-wire line, a portion of the incoming path signal is coupled from the incoming path to the outgoing path through a third amplifier. The phase relationships among the signals appearing on the outgoing path are such that the incoming path signal coupled through the second amplifier is canceled by the incoming path signal coupled through the third amplifier, but signals from the two-wire line appearing on the outgoing path are unaffected thereby.

In these prior art electronic hybrid circuits, however, cancellation of the undesired incoming path signal at the junction between the hybrid and outgoing path is dependent on the impedance characteristics of the outgoing path and the output impedances of the amplifiers connected thereto over the frequency range of interest. For example, if relatively small differences between the amplifier output impedances exist, complete cancellation of the incoming path signal received from the two-wire line is not possible, and the aforementioned interference and oscillatory regeneration can result. This problem is particularly acute where the bandwidth of the signal required to be transmitted is large, since build-up of oscillatory regeneration can more readily occur.

A solution to this problem, provided in the prior art, is to combine the incoming path signal transmitted from the two-wire line and the incoming path signal transmitted directly from the incoming path in a portion of the circuit other than the outgoing path. Such a hybrid arrangement is not subject to the aforementioned impedance difficulties. This approach is taken, for example, in other prior art electronic hybrids, such as that of Pat. 2,945,920. As noted therein, a signal from the incoming path of a four-wire line is applied to the grid of a first electron tube which is connected as a cathode follower, and the signal appearing in response thereto at the cathode of that tube is coupled to a two-wire line. The incoming path signal is also coupled through a frequency compensating network to the grid of a second electron tube. The signal from the two-wire line including the incoming path signal appearing thereon is applied to the cathode of the second electron tube and can be canceled by the incoming path signal coupled through the frequency compensating network to the grid of the second electron tube.

But, such a hybrid circuit is not effective to completely isolate the outgoing path from the two-wire line since the plate and cathode of the second electron tube, which constitute the coupling between the two-wire line and the outgoing path, share a common current path. Consequently, the hybrid operation is dependent on load conditions, and noise on the outgoing path and conditions on the two-wire line can substantially affect the outgoing path. Further, the hybrid is adversely affected by impedance variations on the two-wire line, and substantial signal attenuation must be introduced between the hybrid and the two-wire line to effectively isolate the cathodes of the two electron tubes from the two-wire line.

Additionally, in the aforementioned prior art examples of electronic hybrid circuits, a coupling transformer is essential for connecting the hybrid to a two-wire line which requires a balanced signal to be applied thereto. A signal applied to a transmission line is balanced when the signal component applied to one conductor of the line is equal in amplitude and opposite in phase to the signal component on the other conductor of the line.

Such transformers, while somewhat more economical than hybrid transformers, are generally of large size and weight relative to the other components of an electronic hybrid circuit and also restrict the useful bandwidth which can be obtained from the connected transmission systems.

In view of the foregoing, it is an object of this invention to provide an improved electronic hybrid circuit.

It is another object of this invention to provide lossless transmission of signals between a four-wire line and a two-wire line.

It is a further object of this invention to provide a transformerless means for coupling signals between a four-wire line and a two-wire line without attenuation.

It is still another object of this invention to provide a transformerless hybrid means which isolates the one-way transmission paths of a four-wire line from the connected two-wire line and from each other without signal attenuation.

In accordance with a specific illustrative embodiment of this invention, these and other objects are accomplished by coupling an unbalanced signal, i.e., a signal which appears on only one conductor of a transmission line while the other conductor is at a constant potential, from the incoming path of a four-wire line to a two-wire line through a first differential amplifier, which amplifier outputs apply a balanced signal in response thereto to the two-wire line. An outgoing signal appearing on the two-wire line, which signal includes the amplified incoming path signal thereon, is applied to the inputs of a second differential amplifier coupling the signal from the two-wire line to the outgoing path of the four-wire line. The incoming path signal is further coupled from the incoming path to the second amplifier to cancel the incoming path signal received therein from the two-wire line. The latter signal is applied to the base of a transistor in the second differential amplifier and the former signal is applied to the emitter of the same transistor to effect the desired cancellation. Therefore, only the outgoing signal from the two-wire line appears on the outgoing path.

It is a feature of this invention that a plurality of differential amplifiers simultaneously obtain hybrid action and noise reduction in a transformerless hybrid arrangement.

More particularly, it is a feature of this invention that a first differential amplifier in a hybrid circuit isolates the incoming path of a four-wire line from the two-wire line and the outgoing path, and a second differential amplifier in a hybrid circuit isolates the two-wire line from the outgoing path of the four-wire line.

In accordance with another feature of this invention, a single transistor in a differential amplifier in a hybrid circuit prevents signals from the incoming path of a four-wire line from being coupled to the outgoing path of the four-wire line.

In accordance with more specific features of my invention each differential amplifier includes a pair of transistors whose emitter-collector paths are connected in parallel, the two-wire line being connected to each collector of one amplifier but the four-wire line output path being only connected to one collector of the second amplifier. Accordingly, the second transistor of the second amplifier is isolated from the outgoing path of the four-wire line but provides for the prevention of any signals incoming on the four-wire line appearing on the outgoing path of the four-wire line.

Figure 2:
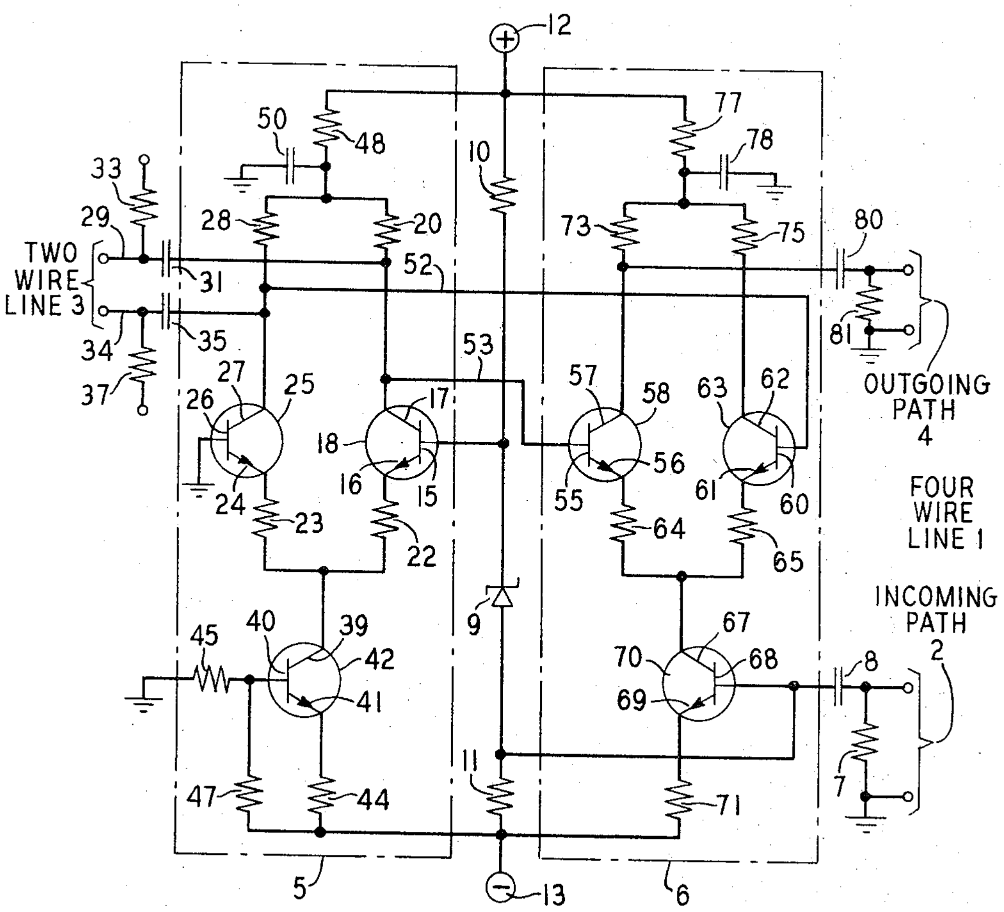

A complete understanding of this invention together with the above-noted objects and features thereof may be obtained by considering the following detailed description and the accompanying drawing, in which:

FIG. 1 is a block representation illustrative of the operating principles of this invention; and FIG. 2 is a schematic representation of a specific illustrative embodiment of this invention in which differential amplifiers are used.

The block representation in FIG. 1 illustrates how an unbalanced incoming signal from a four-wire line may be coupled to a bidirectional, two-wire line without any portion thereof appearing on the outgoing path of the four-wire line and how an outgoing signal from the two-wire line may be coupled to the outgoing path of the four-wire line without any portion thereof appearing on the incoming path of the four-wire line in accordance with this invention. Thus a signal from incoming path 2 of four-wire line 1 is coupled to bidirectional, two-wire line 3 through differential amplifier 5. The incoming path signal is amplified therein and converted to a balanced signal which is applied to two-wire line 3. A balanced outgoing signal from two-wire line 3 is coupled, together with the amplified incoming path signal, through differential amplifier 6 of the outgoing path 4 of four-wire line 1. The two-wire line signal is also applied to amplifier 5 but no portion thereof is coupled to incoming path 2 because of the unidirectional design of amplifier 5.

Incoming path 2 is further connected to a third input of differential amplifier 6 so that a preassigned portion of the incoming path signal is applied directly to amplifier 6. This portion of the incoming path signal is combined with the two-wire line signal and the amplified, incoming path signal in amplifier 6 so as to cancel the amplified, incoming path signal. The outgoing signal from two-wire line 3, however, is unaffected by the directly coupled incoming path signal. The cancellation of the amplified, incoming path signal takes place in a portion of amplifier 6 which is electrically isolated from the outgoing path. Thus only the outgoing signal from two-wire line 3 appears at the output of amplifier 6 on outgoing path 4.

Amplifier 6 is a unidirectional amplifier wherein the output is substantially isolated from the two-wire line and from amplifier 5. Noise and varying load conditions on outgoing path 4, therefore, do not affect signal transmission conditions on two-wire line 3 or the terminating impedance presented to incoming path 2.

Referring to the specific embodiment illustrated in FIG. 2, incoming path 2 of four-wire line 1 is coupled to two-wire line 3 through a first differential amplifier 5 comprising NPN transistors 18, 25, and 42. While NPN transistors are shown in this specific embodiment, PNP transistors or other suitable devices may be used in accordance with the principles of this invention. Impedance 7 is connected across incoming path 2 to help provide appropriate termination for the incoming path. Incoming path 2 is connected via capacitor 8 and Zener diode 9 to base electrode 15 of transistor 18. Resistor 10, connected between positive voltage source 12 and the cathode of Zener diode 9, and resistor 11, connected between the anode of Zener diode 9 and negative voltage source 13, allow a predetermined DC current to flow through Zener diode 9 so that it operates in the breakdown portion of its characteristics in a manner well known in the art. The DC current path through NPN transistors 18, 25, and 42 may be traced from positive voltage source 12 to negative voltage source 13 through the common voltage dropping resistor 48, collector resistors 20 and 28, the collector-emitter paths of transistors 18 and 25, emitter coupling impedances 22 and 23, the collector-emitter path of transistor 42, and resistor 44. Transistor 42 completes the DC current path and advantageously presents a high impedance to signals at a relatively low DC voltage drop as is well known in the art. Resistor 45 is connected between ground and base 40, and resistor 47 is connected between base 40 and negative voltage source 13 to appropriately bias base 40 of transistor 42.

Collector 17 of transistor 18 is connected to conductor 29 of two-wire line 3 through capacitor 31, and collector 27 of transistor 25 is connected to conducter 34 of two-wire line 3 through capacitor 35. Impedances 33 and 37 are connected to conductors 29 and 34, respectively, to aid in properly terminating two-wire line 3. The other terminals of impedance 33 and impedance 37 are connected to constant voltage sources as may be appropriate for operation of two-wire line 3. Collector electrodes 17 and 27 are further connected to conductors 52 and 53, the output conductors of the first differential amplifier. Thus, the first differential amplifier is connected to both the two-wire line 3 and to the second differential amplifier 6.

The second differential amplifier 6, comprising NPN transistors 58, 63, and 70, is coupled between two-wire line 3 and outgoing path 4 and is also coupled to incoming path 2. Again it should be understood that PNP transistors or other suitable devices may be used in accordance with the principles of this invention. Output conductor 52 of the first differential amplifier 5 is connected to base 60 of transistor 63, and conductor 53, the second output conductor of the first differential amplifier 5, is connected to base 55 of transistor 58. Emitter 56 of transistor 58 and emitter 61 of transistor 63 are connected to collector 67 of transistor 70 through resistors 64 and 65, respectively. Incoming path 2 is connected to base electrode 68 via capacitor 8, and emitter 69 is connected to negative voltage source 13 through bias resistor 71. A path is thus provided for combining signals from two-wire line 3, the first differential amplifier 5, and the incoming path 2.

Collector 57 of transistor 58 is connected to outgoing path 4 through capacitor 80 and to the junction of filter capacitor 78 and voltage dropping resistor 77 through resistor 73. Collector 62 of transistor 63 is connected to the junction of filter capacitor 78 and voltage dropping resistor 77 through resistor 75. The other terminal of voltage dropping resistor 77 is connected to the positive voltage source 12. As shown in FIG. 2, no signal output is taken from collector 62. It should be understood that the signal appearing on collector 62 may be taken therefrom and utilized for indicating purposes or in other ways known in the art.

The DC current path for the second differential amplifier 6 may be traced from positive voltage source 12 to negative voltage source 13 through voltage dropping resistor 77, collector resistors 73 and 75, the collector-emitter paths of transistors 58 and 63, emitter resistors 64 and 65, the collector-emitter path of transistor 70, and voltage dropping resistor 71. Collector resistors 20 and 28, via conductors 53 and 52, respectively, form a part of the bias network for base electrodes 55 and 60.

The specific illustrative embodiment shown in FIG. 2 operates as follows. A signal from incoming path 2 of four-wire line 1 is applied through capacitor 8 and Zener diode 9 to base 15 of transistor 18. Impedance 7, connected to incoming path 2 at its junction with capacitor 8, acts at signal frequencies to help to prevent reflection of any portion of the signal back through the incoming path. Capacitor 8 removes any DC component from the incoming path signal that may cause transistors 18 and 70 to be biased outside the linear region of their operating characteristics. The impedance terminating incoming path 2 at signal frequencies is substantially the parallel impedance of impedance 7 and resistors 10 and 11. This is so because capacitor 8 is substantially a short circuit at signal frequencies and the impedances at bases 68 and 15 are extremely high as is well known in the art. The DC current is supplied from positive voltage source 12 through resistors 10 to Zener diode 9 and returned through resistor 11 to negative voltage source 13 to bias Zener diode 9 appropriately in its breakdown region of operation. As is well known in the art, in its breakdown region of operation, Zener diode 9 exhibits a constant voltage drop from cathode to anode but exhibits very little internal impedance. The incoming path signal is thus coupled substantially without attenuation through Zener diode 9, but a selected positive voltage shift occurs from the anode of Zener diode 9 to base 15. The DC voltage at base 15 is selected appropriately to aid in biasing transistor 18 in its linear region of operation. Alternate methods known in the art, such as resistor networks or resistor-capacitor networks, may also be used to couple the incoming path signal to base 15. The methods used must provide appropriate bias voltages for both bases 15 and 68, each of which has a different bias voltage requirement.

A noninverted, amplified signal appears at emitter 16 in response to the incoming path signal applied to base 15, and an inverted amplified signal appears on collector 17 of transistor 18 in accordance with the well-known principles of transistor operation. The signal at emitter 16 of transistor 18 is transmitted through impedance 22 and impedance 23 to emitter 24 of transistor 25. Substantially the entire signal current through impedance 22 is transmitted to the emitter 24. This is so because the impedance of the collector-emitter path of transistor 42 to signal current is relatively high. But, the DC voltage across the collector-emitter path of transistor 42 is relatively low. This permits the DC bias current to pass therethrough to negative voltage source 13 without requiring an exceedingly high voltage across the collector-emitter path of transistor 42. Substantially no signal current flows into collector 39 of transistor 42.

Base 26 is returned directly to a ground reference voltage, and transistor 25 operates in common base mode. Consequently, substantially all the signal current appearing at emitter 24 of transistor 25 is transmitted through the emitter-collector path to collector 27. Because the common base connection is used, there is no phase reversal of the signal current going through the emitter-collector path of transistor 25. Thus, a noninverted, amplified signal appears at collector 27 while an inverted, amplified signal appears at collector 17 in response to the signal from the incoming path 2. The inverted signal from collector 17 is transmitted through capacitor 31 to conductor 29 of two-wire line 3 and the noninverted signal from collector 27 is transmitted through capacitor 35 to conductor 34 of two-wire line 3. In this way a balanced amplified signal in response to the incoming path signal is applied to the two-wire line.

Impedances 33 and 37, connected between conductors 29 and 34 and constant voltage sources, are adjusted to provide an appropriate termination for two-wire line 3 at the signal frequencies. The termination for line 3 is substantially the paralleled impedances of resistor 20 and impedance 33 in series with the paralleled impedances of resistor 28 and impedance 37. If these paralleled impedances are each adjusted to be equal to one-half the impedance of two-wire line 3, the line is appropriately terminated to minimize reflections. Capacitors 31 and 35 are selected so that their impedances at signal frequencies are substantially zero. When impedances 33 and 37 are appropriately adjusted, there are substantially no reflections on two-wire line 3. After emitter impedances 22 and 23 are adjusted to compensate for any phase shift of the incoming path signal that may result from the above-described impedance matching of two-wire line 3. cancellation in the manner to be described is effective to eliminate the incoming path signal from the outgoing path.

A balanced outgoing signal from two-wire line 3 is applied through capacitors 31 and 35 to collectors 17 and 27, respectively, so that both the balanced two-wire line signal and the amplified incoming path signal are applied to output conductors 52 and 53 of first differential amplifier 5. Collector resistors 20 and 28, together with voltage dropping resistors 48 and 44, are designed so that NPN transistors 18, 25, and 42 are biased in their linear region of operation in the presence of the bias voltages applied to bases 15, 26, and 40. Filter capacitor 50 prevents attenuation of signals at the first differential amplifier outputs by not allowing any portion of the signals appearing on collectors 17 or 27 to be impressed across voltage dropping resistor 48. Thus, the first differential amplifier 5 accepts a signal from incoming path 2 and applies a balanced signal in response thereto to two-wire line 3.

Since the collectors 17 and 27, as is well known in the art, are substantially isolated from the input to the first differential amplifier 5 at base 15, no portion of the signal applied to collectors 17 and 27 appears on incoming path 2, and thus the incoming path 2 is not affected by conditions or changes in conditions on two-wire line 3. Even if a short circuit occurred across two-wire line 3, incoming path 2 would remain substantially unaffected.

The second differential amplifier 6 is connected to the first differential amplifier 5 outputs through conductors 52 and 53. Base 55 of transistor 58 receives the portion of the two-wire line signal applied to collector 17 and the inverted, amplified, incoming path signal appearing at collector 17. Concurrently, base 60 of transistor 63 receives the two-wire line signal applied to collector 27 and the noninverted, amplified, incoming path signal appearing at collector 27. Since emitter 56 is connected to emitter 61 through resistors 64 and 65, any signal components equal in amplitude and opposite in phase applied to bases 55 and 60, in effect, add to each other and cause outputs to appear on collectors 57 and 62. But, any signal components on output conductors 52 and 53 that are identical in both amplitude and phase are canceled in accordance with the well-known principles of differential amplifier operation. Thus, any component of the outgoing signal which may represent noise or other undesired interference common to both conductors 29 and 34 is prevented from appearing on outgoing path 4.

If it is assumed that incoming path 2 is not connected to base 68, the signal on collector 57 comprises the amplified incoming path signal from the first differential amplifier 5, since the signals, in response to the incoming path signal, on conductors 52 and 53 are of a balanced nature. But, the incoming path signal, after being transmitted through capacitor 8, is also applied to base 68 of transistor 70, and an inverted, amplified, incoming path signal in response thereto appears on collector 67. The signal through transistor 70 from base 68 to collector 67 is so determined that the inverted signal appearing at collector 67 is effective to completely cancel the inverted, amplified, incoming path signal applied to base 55 of transistor 58. The signal at collector 67, which is responsive only to the incoming path signal, is transmitted through coupling resistors 64 and 65 to emitters 56 and 61, respectively. The amplitude of the signal at emitter 56 from collector 67 is equal in amplitude and identical in phase to the component of the signal at base 55 appearing thereon in response to the inverted, incoming path signal from collector 17. Thus these signals cancel each other in a part of amplifier 6 which is isolated from outgoing path 4. No portion of the incoming path signal which is transmitted through the first amplifier 5 appears at collector 57 of transistor 58. The signal appearing on collector 62 comprises a component due to the amplified, incoming path signal from conductors 52 and 53 enhanced by the incoming path signal on collector 67. But only the output of collector 57 is applied to outgoing path 4. Therefore, no portion of the incoming path signal appears on outgoing path 4 of four-wire line 1.

Thus, the second differential amplifier 6 accepts a balanced outgoing signal from both wires of two-wire line 3, and the incoming path signal from both outputs of amplifier 5 as well as directly from incoming path 2. In turn, amplifier 6 applies a signal to outgoing path 4 in response thereto. Since the input bases 55, 60, and 68 of amplifier 6 are substantially isolated from outgoing path 4 in accordance with the well-known principles of transsistor operation, amplifier 6 and incoming path 2 as well as two-wire line 3 are substantially unaffected by conditions or changes in conditions on outgoing path 4. Even a short circuit occurring on outgoing path 4 will not appreciably affect incoming path 2 or two-wire line 3.

As previously described, it is necessary to cancel the inverted, incoming path signal applied to base 55 with the inverted, incoming path signal appearing on collector 67 of transistor 70 in order that no portion of the incoming path signal appears on outgoing path 4. Such cancellation occurs if there is no signal current component in emitter 56 of transistor 58 due to the incoming path signal applied to the hybrid circuit from incoming path 2. The following shows how this result is obtained in the specific illustrative embodiment of FIG. 2. It is understood that other techniques can be used to achieve this result in accordance with the principles of this invention.

Assume a signal voltage V is applied to base 68 through capacitor 8. An equal signal voltage V is also applied to base 15 through capacitor 8 and Zener diode 9 from incoming path 2 because of the lossless coupling through Zener diode 9. The signal current flowing from emitter 69 of transistor 70 through resistor 71 is then approximately the signal voltage V divided by the resistance of resistor 71. Substantially the same current will flow into collector 67. If the resistance of resistor 64 is made equal to that of resistor 65, one-half of this collector current will flow from emitter 56 into resistor 64 in accordance with the known principles of transistor operation.

The value of impedance 22 is made equal to the value of impedance 23 and impedances 22 and 23 are chosen so that the sum of the two is effective to compensate for any phase shift of the incoming path signal at collector 27 due to the impedance thereon. The signal appearing at collector 27 in response to the incoming path signal is then equal to and opposite in phase to the signal at collector 17. Further, if the total resistance connected to collectors 17 and 27 respectively at signal frequencies is such that a signal voltage $+V/2$ appears at collector 27 in response to the signal voltage +V from incoming path 2, the current flowing in amplifier 6 from emitter 61 through resistors 65 and 64 to emitter 56 due to the amplified incoming path signal from amplifier 5 is substantially the signal voltage V divided by the total resistance of resistors 64 and 65. This is true because $+V/2$ is applied to base 60 via conductor 52 and $-V/2$ is applied to base 55 via conductor 53. As is well known in the art, the signal voltage at the emitter of a transistor is substantially the same as the signal voltage applied to the base of the same transistor. The resistance of resistor 64 and resistor 65 can each be appropriately chosen to be equal to the resistance of resistor 71. Thus, a current of V divided by twice the resistance of resistor 71 flows into emitter 56 through resistor 64 in response to the incoming path signal from differential amplifier 5. But, because of the signal voltage +V applied to base 68 of transistor 70, a signal current of equal magnitude flows out of emitter 56 through resistor 64. The net signal current at emitter 56 due to the incoming signal voltage V is zero. In the absence of signal current in emitter 56, there is no signal current due to the signal voltage +V from incoming path 2 in collector 57. Consequently, in accordance with the principles of this invention, no signal appears on outgoing path 4 in response to a signal from incoming path 2.

The following is a specific example of an electronic hybrid circuit designed in accordance with this invention. The incoming path 2 and outgoing path 4 of four-wire line 1 each has an impedance of 1,000 ohms and the impedance of two-wire line 3 is also 1,000 ohms. In order to obtain complete cancellation, resistor 71 is 500 ohms, impedances 22 and 23 are each 250 ohms, resistors 20, 28 and impedances 33, 37 are each 1,000 ohms and resistors 64 and 65 are each 500 ohms. With these values of resistance, complete cancellation of the incoming path signal in transistor 58 is accomplished in accordance with the previous description. Of course, other values of impedance may be selected consistent with the impedances of the connected two-wire and four-wire lines and the amplification desired from the hybrid circuit.

While the principles of this invention have been described in connection with a specific illustrative embodiment, it is to be understood that this description is made only by way of example. Numerous other embodiments may be devised by those skilled in the art without departing from the spirit and the scope of this invention.

What is claimed is:

1. A hybrid circuit comprising a first differential amplifier coupled between the incoming path of a four-wire line and a two-wire line, a second differential amplifier coupled between said two-wire line and the outgoing path of said four-wire line, means for applying a signal from said incoming path to said first amplifier, means for applying the amplified incoming path signal to said two-wire line, means for applying said amplified incoming path signal and an outgoing signal from said two-wire line to said second amplifier, and means for applying said signal from said incoming path to said second amplifier, said second amplifier further comprising means isolated from said outgoing path and responsive to receipt of said incoming path signal and said amplified incoming path signal for permitting only said outgoing signal from said two-wire line to be coupled to said outgoing path.

2. A transformerless hybrid circuit in accordance with claim 1 wherein said means for permitting only said outgoing signal from said two-wire line to be coupled to said outgoing path comprises a transistor having input, output, and control electrodes, means responsive to said amplified incoming path signal from said two-wire line for applying a first signal current to said input electrode and means responsive to said incoming path signal for applying to said input electrode a signal current of equal amplitude and opposite phase to said first signal current to cancel said first signal current.

3. A transformerless hybrid circuit comprising first differential amplifier means for coupling the incoming path of a four-wire line to a two-wire line, second differential means for coupling said two-wire line to the outgoing path of said four-wire line, means for applying an unbalanced signal from said incoming path to said first differential amplifier means, means comprising said first differential amplifier means for applying a balanced signal to said two-wire line in response to said incoming path signal, means for applying a balanced outgoing signal from said two-wire line and said balanced signal coupled to said two-wire line to said second differential amplifier means, and means for applying said incoming path signal to said second differential amplifier means, said second differential amplifier means comprising means isolated from said outgoing path and responsive to receipt of said incoming path signal and said balanced signal coupled to said two-wire line for permitting only said outgoing signal to appear on said outgoing path.

4. A transformerless hybrid circuit in accordance with claim 3 wherein said means for applying the balanced signal to said two-wire line comprises means for applying a coupled incoming path signal to one conductor of said two-wire line and means for applying an equal signal of opposite phase to said coupled incoming path signal to the other conductor of said two-wire line, and wherein said means for permitting only said outgoing signal to appear on said outgoing path comprises a transistor, means for applying said signal of opposite phase to the base electrode of said transistor and means for applying a signal of opposite phase to said incoming path signal to the emitter electrode of said transistor.

5. A transformerless hybrid circuit in accordance with claim 4 wherein said first differential amplifier means comprises first and second transistors each having base, emitter and collector electrodes and impedance means connected between the emitter electrode of said first transistor and the emitter electrode of said second transistor for transmitting the signal appearing at the emitter electrode of said first transistor in response to said incoming path signal to said second transistor, wherein said means for applying the coupled incoming path signal to said one conductor of said two-wire line comprises first impedance means connected between the collector electrode of said second transistor and said one conductor of said two-wire line for matching the impedance of said two-wire line, wherein said means for applying said equal signal of opposite phase to said coupled incoming path signal to said other conductor of said two-wire line comprises second impedance means connected between the collector electrode of said first transistor and said other conductor of said two-wire line for matching the impedance of said two-wire line, and wherein said means for applying an unbalanced signal from said incoming path to said first differential amplifier means comprises coupling means connected between said incoming path and the base electrode of said first transistor.

6. A transformerless hybrid circuit according to claim 5 wherein said second differential amplifier comprises third, fourth and fifth transistors each having base, emitter and collector electrodes, impedance means connected between the emitter electrode of said third transistor, the emitter electrode of said fourth transistor, and the collector electrode of said fifth transistor for transmitting the signal appearing at the collector electrode of said fifth transistor in response to receipt of said incoming path signal at the base electrode of said fifth transistor to the emitter electrode of said third transistor, means for applying an equal signal of opposite phase to said coupled incoming path signal to the base electrode of said third transistor comprising interconnection means between the base electrode of said third transistor and the collector electrode of said first transistor and wherein interconnection means are provided for applying said coupled incoming signal from the collector electrode of said second transistor to the base electrode of said fourth transistor.

7. A transformerless hybrid circuit comprising first differential amplifying means for coupling signals from the incoming path of a four-wire line to a two-wire line, second differential amplifying means for coupling signals from said two-wire line to the outgoing path of said four-wire line, means for applying a signal from said incoming path to said first differential amplifying means, means for applying the coupled incoming path signal and an outgoing signal from said two-wire line to said second differential amplifying means, and third means for applying said incoming path signal to said second differential amplifying means, said second differential amplifying means further comprising means isolated from said outgoing path and responsive to receipt of said incoming path signal from said third means and from said two-wire line for permitting only said outgoing signal to appear on said outgoing path.

References Cited

UNITED STATES PATENTS 3,453,395 7/1969 Englund ------------ 179—81
2,629,024 2/1953 Edwards.
3,180,947 4/1965 Haselton et al.

WILLIAM C. COOPER, Primary Examiner
W. A. HELVESTINE, Assistant Examiner

U.S. Cl. X.R.

179—81